United States Patent [19]

Paul, 3rd

[11] 4,316,979

[45] Feb. 23, 1982

[54] INSULATING GLASS SEALANT AND RELATED COMPOSITIONS

[75] Inventor: Henry N. Paul, 3rd, Philadelphia, Pa.

[73] Assignee: Thiokol Corporation, Newtown, Pa.

[21] Appl. No.: 176,940

[22] Filed: Aug. 11, 1980

Related U.S. Application Data

[63] Continuation of Ser. No. 96,714, Nov. 21, 1979, abandoned, which is a continuation of Ser. No. 953,825, Oct. 23, 1978, abandoned.

[51] Int. Cl.$^3$ .............................................. C08L 63/00
[52] U.S. Cl. .................................... 528/109; 525/113
[58] Field of Search .......................... 260/830 S, 836; 525/113; 528/109

[56] References Cited

U.S. PATENT DOCUMENTS

| | | | |
|---|---|---|---|
| 3,926,903 | 12/1975 | Scola | 260/837 R |
| 3,926,904 | 12/1975 | Scola | 260/836 |
| 4,018,847 | 4/1977 | Messerly | 260/836 |
| 4,055,541 | 10/1977 | Riew | 260/836 |
| 4,058,657 | 11/1977 | Ireland | 260/836 |
| 4,088,708 | 5/1978 | Riew | 260/836 |
| 4,126,505 | 11/1978 | Garnish | 260/836 |
| 4,214,067 | 7/1980 | Packer | 528/109 |

OTHER PUBLICATIONS

Handbook of Epoxy Resins, Henry Lee et al.; McGraw-Hill Book Co., New York, (1967), pp. 16-21 through 16-25.

*Primary Examiner*—Paul Lieberman
*Attorney, Agent, or Firm*—Royal E. Bright; Richard J. Sheridan; Gerald K. White

[57] ABSTRACT

Compositions of matter comprising a liquid thiol terminated polysulfide polymer, a liquid epoxy resin and a liquid amine terminated polymer containing from about 1.7 to about 4 amine groups per molecule of the general formula

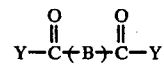

wherein Y is a univalent radical derived by removal of an amine hydrogen from an aliphatic, alicyclic, heterocyclic or aromatic amine containing from 2 to about 20 carbon atoms and at least 2 amino groups and B is a polymeric backbone comprising carbon-carbon linkages are disclosed. Insulated window units fabricated therefrom possess superior mechanical and dewpoint retention properties.

6 Claims, No Drawings

INSULATING GLASS SEALANT AND RELATED COMPOSITIONS

This application is a continuation of application Ser. No. 96,714, filed Nov. 21, 1979 which in turn is a continuation of prior application Ser. No. 953,825 filed Oct. 23, 1978 and now abandoned.

BACKGROUND OF THE INVENTION

This invention relates to the art of polysulfide polymers, particularly liquid thiol terminated polysulfide polymers, curing thereof, particularly co-cures with other functionally suitable polymers and to the art of insulated glass windows, particularly the fabrication of sealants therefor.

The use of liquid thiol terminated polysulfide polymers in the formulation of sealants for insulated glass window sandwiches is well known and such sealants are in commercial use. These sealants, because of their polar nature, are somewhat permeable to water vapor. For premium properties with regard to the exclusion of water vapor from the interior of insulated window sandwiches the application of a first sealant layer with a high impermeability to moisture vapor, such as a butyl latex caulk, has been required in commercial practice until now. These highly impermeable caulks or sealants have inherently low physical strength and so the use of a second higher strength sealant, such as the polysulfide based sealants, or a mechanical support means has been required to attain an adequate balance of premium moisture exclusion and structural strength.

The present invention provides a composition which gives excellent structural strength coupled with low moisture vapor permeability.

Applicant is unaware of any art material to the patentability of the invention claimed in this application.

SUMMARY OF THE INVENTION

The invention provides a composition comprising:
(a) a liquid thiol terminated polysulfide polymer;
(b) a liquid epoxy resin; and
(c) a liquid amine terminated polymer containing an average from about 1.7 to about 4 amine groups per molecule of the Formula I

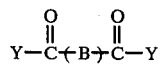   (I)

wherein Y is a univalent radical obtained by the removal of an amine hydrogen from an aliphatic, alicyclic, heterocyclic or aromatic amine containing from 2 to 20 carbon atoms and at least 2 amine groups, at least 2 of said amine groups being primary or secondary and B is a polymeric backbone comprising carbon-carbon linkages.

The tangible embodiments of this composition aspect of the invention possess the inherent applied use characteristic of being viscous, pourable or extrudable fluids curable to rubbery solids with excellent adherence to wood, metal, glass, concrete and other construction materials, thus evidencing their usefulness in the fabrication of insulating glass window sealants, architectural caulks and the like, as well as in formulating cure in place gaskets for window units in automobiles, trains, trucks, ships and aircraft.

Particularly preferred embodiments of this composition aspect of the invention are two-part sealant compositions packed with the liquid thiol terminated polysulfide polymer and the amine terminated polymer comprising one package and the liquid epoxy resin comprising a second package.

The invention also provides a cured elastomeric product comprising the reaction products of a mixture of
(a) a liquid thiol terminated polysulfide polymer;
(b) a liquid epoxy resin; and
(c) a liquid amino terminated polymer of Formula I.

The invention also provides an article of manufacture comprising a substrate coated on at least one surface thereof with a cured elastomer comprising the reaction products of
(a) a liquid thiol terminated polysulfide polymer;
(b) a liquid epoxy resin; and
(c) a liquid amino terminated polymer of Formula I.

DESCRIPTION OF THE PREFERRED EMBODIMENT

The manner of making and using the compositions of the inventions will now be described with reference to a specific embodiment thereof, namely an insulated window sealant comprising the reaction products of a liquid thiol terminated polysulfide polymer based on bis(2-chloroethyl) formal containing 2.0% crosslinking, having about 6.6%—SH, and of about 1,000 average molecular weight (Polysulfide Polymer A), a liquid bisphenol A based epoxy resin of about 350 to 400 molecular weight having an epoxide equivalent of about 175-210 (EPON 828—Shell Chemical Co.) and a liquid amine terminated butadiene-acrylonitrile copolymer of the general structure:

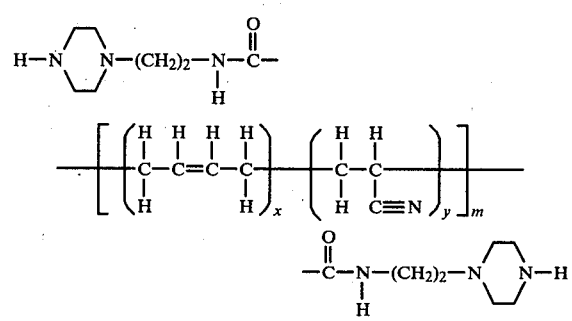

where x=5, y=1 and m=10 (approximately) [HYCAR ATBN (1300×16) B. F. Goodrich Co.].

To prepare the sealant, one may, if desired, mix the three liquid polymers together in any conventional mixing equipment or paint milling equipment together with any desired conventional sealant additives, such as pigments or filters, viscosity and sag control agents, adhesion promoters and the like, apply the mixed sealant to the channel of an insulated glass window unit and allow cure to take place.

One skilled in the art will recognize that the thiol terminated liquid polysulfide polymer and the amine terminated liquid butadiene acrylonitrile polymer both contain active hydrogen functional groups sufficient to initiate a cure reaction with the epoxy resin and that once initiated, such cure may be expected to continue until complete cure of the epoxy resin is achieved. If storage stability of the sealant is desired, the uncured material may be formulated as a two package system with one package comprising the liquid polysulfide polymer and the liquid butadiene-acrylonitrile copolymer and the other package comprising the epoxy resin. It is preferred for maximum storage stability that the majority of the fillers be packaged with the epoxy resin and that a sufficient amount of an inert pigment such as titanium dioxide be added to the polysulfide-butadiene-acrylonitrile mixture to insure lack of phase separation. The exact amount of this inert pigment is, of course, not particularly critical, may be readily determined by a simple graded series of experiments by one skilled in the art and for titanium dioxide may range upwards from about 4.0% by weight of the combined weights of the polysulfide polymer and the butadiene-acrylonitrile polymer. Blending of the two-part mixture may be accomplished just prior to application to the desired substrate. Conventional mixing and application techniques, as stated hereinabove, will be applicable to this process also.

One skilled in the art will recognize that in addition to the particular thiol terminated liquid polysulfide polymer based on bis(2-chloroethyl) formal of about 1,000 molecular weight and with about 2% crosslinking any of the well-known thiol terminated liquid polysulfide polymers of the general structure

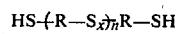

wherein R is a hydrocarbon, oxahydrocarbon or thiahydrocarbon diradical such as the ethyl formal diradical (—CH$_2$—CH$_2$—O—CH$_2$—O—CH$_2$—CH$_2$—), the butyl formal diradical (—CH$_2$—CH$_2$—CH$_2$—CH$_2$—O—CH$_2$—O—CH$_2$—CH$_2$—CH$_2$—CH$_2$—), the ethyl ether diradical (—CH$_2$—CH$_2$—O—CH$_2$—CH$_2$—), and the butyl ether diradical (—CH$_2$—CH$_2$—CH$_2$—CH$_2$—O—CH$_2$—CH$_2$—CH$_2$—CH$_2$—), and x is about 2 to about 4 and n may vary from 4 to about 23 may be employed. These polymers are described in U.S. Pat. No. 2,466,963.

One skilled in the art will also recognize that in addition to the EPON 828 liquid epoxy resin, any liquid epoxy resin may be employed. Epoxy resins commercially available in the United States are considered to be derived from the diglycidyl ether of bisphenol A (and its homologues), glycidyl ethers of bisphenol F, glycidyl ethers of glycerol, glycidyl ethers of tetrakis (hydroxy phenyl) ethane and epoxylated novolacs. The bisphenol A derivatives are thought to predominate. Typical liquid epoxy resins which may be commercially obtained and which are difunctional bisphenol A based materials unless otherwise noted are ERL-2774, 3794 (higher functionality) and 2795 by the Bakelight Co. Division of Union Carbide and Carbon Co.; ARALDITE ® 502, 6005, 6010, 6020 and 6030 by Ciba-Geigy Co.; DER 331, 332 and 334 by The Dow Chemical Co.; EPI REZ® 510 by the Jones-Dabney Co.; EPON 562 (aliphatic based), 815, 820, 828 and 834 by the Shell Chemical Co. Typical compounds which may be employed in the synthesis of other liquid epoxy resins suitable for the use in the practice of this invention are:

Halohydrins, such as epichlorohydrin, dichlorohydrin, and 1,2-dichloro-3-hydroxy-propane.

Diepoxies, such as butadiene dioxide and diglycidyl ether.

Mononuclear di- and tri-hydroxyphenols, such as resorcinol, hydroquinone, pyrocatechol, saligenin and phloroglucinol polynuclear polyhydroxy phenols, such as bisphenol A, bisphenol F, tri-hydroxyl diphenyl dimethyl methane, 4,4'-dihydroxy biphenyl, long chain bisphenols of the general structure

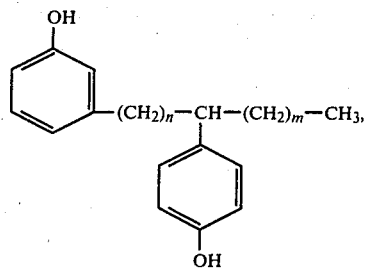

dihydroxydiphenyl sulfone and novolac resins of the general structure

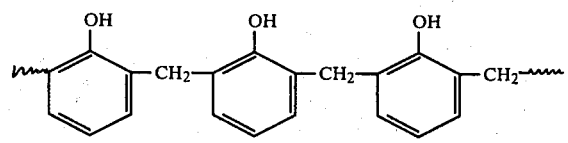

and polyalcohols, such as ethylene glycol, 2,3-butanediol, glycerol and erthritol.

Similarly, one skilled in the art will recognize that in addition to the HYCAR ATBN described, any liquid amine terminated polybutadiene resin such as those described in U.S. Pat. No. 4,058,657 may be employed as a full equivalent in formulating the compositions of the invention.

One skilled in the art will recognize that the relative proportions of the polysulfide polymer, the epoxy resin and the amine terminated butadiene acrylonitrile polymer may vary through wide limits. Conveniently, one may employ from about 10% to about 50% polysulfide polymer, preferably from about 20% to about 30%, from about 10% to about 50% epoxy resin, preferably from about 20% to about 30% and from about 30% to about 70% amine terminated butadiene-acrylonitrile polymer, preferably from about 45% to about 55%. If the active hydrogen or epoxy functionality of a particular ingredient chosen varies substantially from the values of the particular polysulfide polymer, epoxy resin and amine terminated butadiene acrylontrile polymer illustrated then one skilled in the art would adjust the relative percentages accordingly. Other ingredients, such as pigments, fillers, thixotropic and sag control agents, adhesion promoters and the like may, if desired, be employed in quantities similar to those employed in known formulations in the art.

The following examples further illustrate the best mode contemplated by the inventor for the practice of his invention.

EXAMPLE 1

A two-part sealant is formulated from the ingredients listed in the quantities in parts by weight (pbw) shown and mixed. Physical properties and results of ASTM proposed standard E6P1 for testing seal longevity of insulating glass units are shown.

|  | Quantity |
|---|---|
| Part A |  |
| Polysulfide polymer A | 52 |
| HYCAR ATBN (1300 × 16) | 100 |
| Titanium dioxide (TITANOX 2032) | 7 |
| Part B |  |
| THIXCIN GR | 10 |

-continued

| | |
|---|---|
| SANTICIZER 278 (phthalate plasticizer) | 30 |
| CaCO₃ (CAMELTEX) | 40 |
| CaCO₃ (HOMOCAL G-50) | 27 |
| CaCO₃ (KOTAMITE) | 101 |
| SILANE A-187 | 4 |
| EPON 828 | 52 |

Properties

| | |
|---|---|
| Sag, Veritical (inches) | ⅛ |
| Tensile (psi) (INSTRON) | 668 |
| Elongation (%) (INSTRON) | 100 |
| Modulus, 100% (psi) | 668 |
| Durometer Hardness (Shore A) (1 week cure) | 80 |

Performance in Window Units (2 units) (2 of 4 channels filled with molecular sieve dessicant)

| | A | B |
|---|---|---|
| Original Dew Point (°F.) | >−90 | >−90 |
| Dew Point (°F.) at: | | |
| 2 wks. at 140° F./100% Relative Humidity (R.H.) + 24 hrs. at Room Temperature (R.T.) | −78 | −74 |
| 2 wks. in SIGMA* tower + 24 hrs. at R.T. | −80 | −72 |
| 4 wks. in SIGMA tower + 24 hrs. at R.T. | −70 | −72 |
| 8 wks. in SIGMA tower + 24 hrs. at R.T. plus | −57 | −53 |
| 2 wks. at 140° F./100% R.H. + 24 hrs. at R.T. | −55 | −51 |
| 2 wks. in SIGMA tower + 24 hrs. at R.T. plus | −46 | −40 |
| 2 wks. at 140° F./100% R.H. + 24 hrs. at R.T. | −6 | 0 |
| Angular Fog by 12 GP8** test | | None |

Performance with all 4 channels filled with molecular sieve dessicants (values average of 2 units)

| | |
|---|---|
| Original Dew Point (°F.) | >−90 |
| Dew Point (°F.) at: | |
| 2 weeks at 140° F./100% R.H. + 24 hrs. at R.T. | >−90 |
| 4 weeks SIGMA tower + 24 hrs. R.T. | >−90 |
| 8 weeks SIGMA tower + 24 hrs. R.T. plus | −88 |
| 2 weeks at 140° F./100% R.H. + 24 hrs. at R.T. | −83 |
| 2 weeks in SIGMA tower + 24 hrs. R.T. plus | −81 |
| 2 weeks at 140° F./100% R.H. + 24 hrs. at R.T. | −74 |
| 2 weeks in SIGMA tower + 24 hrs. R.T. | −74 |
| At this point, the window units exceed SIGMA Class A level rating which requires Dew Point of −20° F. or lower. Continue testing: | |
| 2 weeks at 140° F./100% R.H. + 24 hrs. at R.T. | −71 |
| 2 weeks in SIGMA tower + 24 hrs. at R.T. | −74 |

*Sealed Insulating Glass Manufacturers Assoc. Specification 65-7-2 (1974 edition).
**Standards Council of Canada Standard CAN2-12.8-M76 (formerly CGSB 12-GP-8M).

EXAMPLE 2

A thiol terminated liquid polysulfide polymer with 0.5% crosslinking of about 4,000 molecular weight and approximately 1.6%—SH (polysulfide polymer B), EPON 828 and HYCAR ATBN are blended in the quantities shown in pbw, absence of cure and physical and adhesion to glass properties of those blends which cured are shown.

| | 1 | 2 | 3 | 4 | 5 | 6 | 7 |
|---|---|---|---|---|---|---|---|
| Polysulfide polymer B | 100 | 100 | 100 | 100 | 100 | 100 | 100 |
| EPON 828 | 100 | 100 | 100 | 100 | 100 | 100 | 100 |
| HYCAR ATBN | 10 | 40 | 70 | 100 | 130 | 160 | 190 |
| Hardness (Shore A) | | | | | | | |
| 1 day | no cure | no cure | no cure | surface cure | ~20 | ~25 | ~30 |
| 2 days | no cure | no cure | no cure | surface cure | ~35 | ~45 | ~55 |
| 7 days | no cure | no cure | no cure | surface cure | ~75 | ~78 | ~80 |
| Adhesion to Glass (1 week) | — | — | — | — | + | + | + |
| Tensile (psi)/ Elongation (%) (est.) | | | | | | | |
| 1 day | — | — | — | — | 125/600 | 200/500 | 350/400 |
| 7 days | — | — | — | — | >350/>400 | >350/>400 | >350/>400 |

EXAMPLE 3

Similarly to Example 2, Polysulfide polymer B, EPON 828 and HYCAR ATBN are blended in the proportions shown. Physical properties obtained are shown.

| | | | | |
|---|---|---|---|---|
| Polysulfide polymer B | 100 | 100 | 100 | 100 |
| EPON 828 | 100 | 100 | 100 | 100 |
| HYCAR ATBN | 210 | 240 | 270 | 300 |
| Hardness (Shore A) | | | | |
| 1 day | 30 | 32 | 33 | 35 |
| 2 days | 52 | 60 | 60 | 60 |
| 3 days | 75 | 77 | 77 | 75 |

The subject matter which applicant regards as his invention is particularly pointed out and distinctly claimed as follows:

1. A composition comprising
   (a) from about 10% to about 50% of a liquid thiol terminated polysulfide polymer having a molecular weight of at least about 1000;
   (b) from about 10% to about 50% of a liquid epoxy resin; and
   (c) from about 30% to about 70% of a liquid amine terminated polymer containing on average from about 1.7 to about 4 amine groups and having the structure

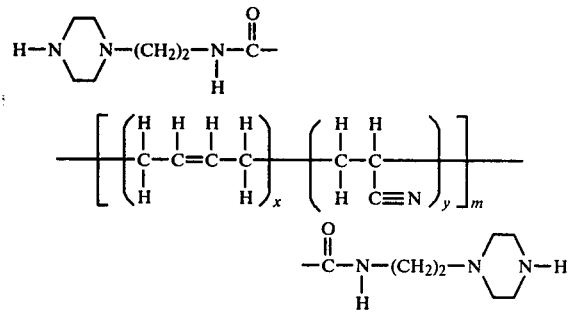

wherein x is about 5, y is about 1 and m is about 10.

2. A composition as defined in claim 1 comprising a liquid thiol terminated polysulfide polymer based on bis (2-chloroethyl) formal containing 2.0% crosslinking and having an average molecular weight of about 1,000; a liquid bisphenol A based epoxy resin having an epoxide equivalent of about 175-210.

3. A cured elastomeric product comprising the reaction products of:

(a) from about 10% to about 50% of a liquid thiol terminated polysulfide polymer having a molecular weight of at least about 1000;
(b) from about 10% to about 50% of a liquid epoxy resin; and
(c) from about 30% to about 70% of a liquid amine terminated polymer containing on average from about 1.7 to about 4 amine groups per molecule of the formula: and having the structure

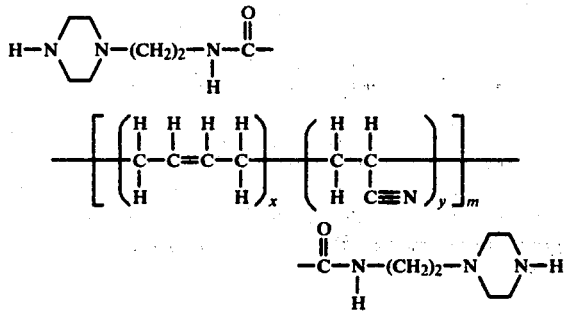

wherein x is about 5, y is about 1 and m is about 10.

4. An article of manufacture comprising a substrate coated on at least one surface thereof with a cured elastomer comprising the reaction products of:
(a) from about 10% to about 50% of a liquid thiol terminated polysulfide polymer having a molecular weight of at least about 1000;
(b) from about 10% to about 50% of a liquid epoxy resin; and
(c) from about 30% to about 70% of a liquid amine terminated polymer containing on average from about 1.7 to about 4 amine groups per molecule of the formula: and having the structure

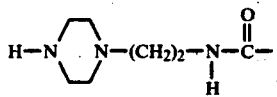

-continued

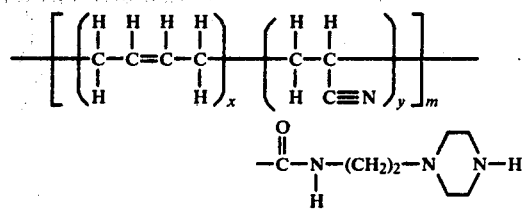

wherein x is about 5, y is about 1 and m is about 10.

5. A composition as defined in claim 1 comprising from about 20% to about 30% polysulfide polymer; from about 45% to about 55% amine terminated butadiene acrylonitrile polymer and from about 20% to about 30% epoxy resin.

6. A composition as defined in claim 1 comprising 52 parts by weight liquid thiol terminated polysulfide polymer based on bis (2-chloroethyl) formal containing 2.0% crosslinking, having about 6.6%—SH and of about 1,000 average molecular weight; 100 parts by weight amine terminated butadiene acrylonitrile molecular of the formula:

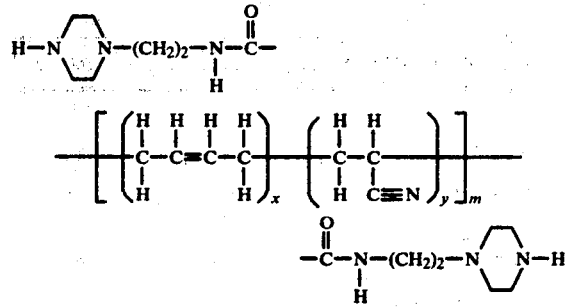

where $x=5$, $y=1$, and $m=10$; and 52 parts by weight of a bisphenol A based epoxy resin of about 350 to 400 molecular weight having an epoxide equivalent of about 175–210.

* * * * *